(12) United States Patent
Li

(10) Patent No.: US 8,284,309 B2
(45) Date of Patent: Oct. 9, 2012

(54) DEVICE AND METHOD FOR DISPLAYING CAPTION WINDOW

(75) Inventor: Cheng-Hao Li, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 356 days.

(21) Appl. No.: 12/647,658

(22) Filed: Dec. 28, 2009

(65) Prior Publication Data

US 2010/0177242 A1    Jul. 15, 2010

(30) Foreign Application Priority Data

Jan. 12, 2009    (CN) .......................... 2009 1 0001559

(51) Int. Cl.
*H04N 7/00* (2006.01)
*H04N 11/00* (2006.01)

(52) U.S. Cl. ..................................................... 348/468

(58) Field of Classification Search .................. 348/468, 348/563, 589, 600; 345/484–488; 715/784–785
See application file for complete search history.

(56) References Cited

U.S. PATENT DOCUMENTS 4,670,745 A * 6/1987 O'Malley et al. ............. 345/572

FOREIGN PATENT DOCUMENTS

CN    1781153    5/2006

OTHER PUBLICATIONS

Masami Harigai, Tsutomu Nakazawa, Takeshi Yoshida, Yutaka Hirakoso, Kenji Suto, and Hiroaki Negishi."LSI chip set for closed caption decoder system" Sanyo Electric Co., Ltd. Gunma Japan. Aug. 1991.

* cited by examiner

*Primary Examiner* — Michael Lee
(74) *Attorney, Agent, or Firm* — WPAT PC.; Justin King

(57) ABSTRACT

A device and method for displaying a caption window is provided. The method receives a first window-defining command by a TV controller, with the first window-defining command including a first window size and first caption content. A first caption data according to the first caption content is generated and stored into a system memory. a first portion of the first caption data stored in the system memory is accessed and displayed. A first offset stored in an offset register is updated to a second offset after a predetermined period. A second portion of the first caption data is accessed and displayed according to the second offset and the first window size.

10 Claims, 7 Drawing Sheets

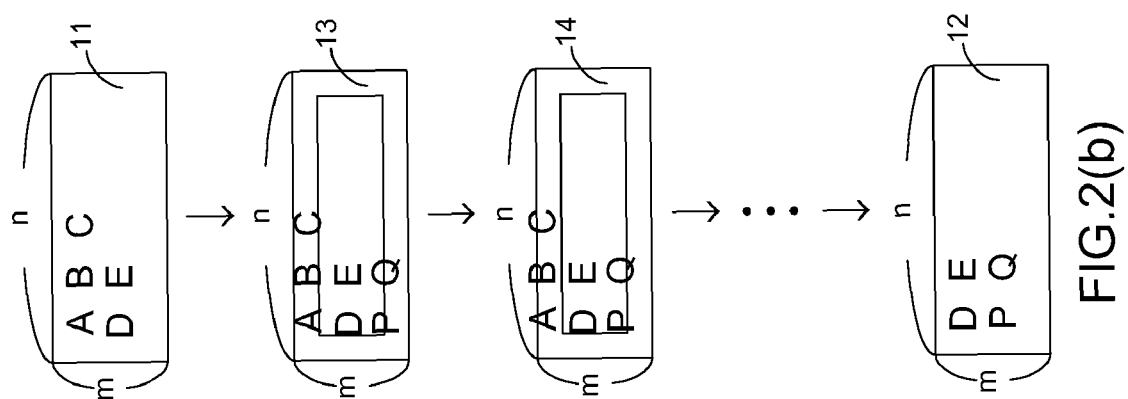

DEVICE AND METHOD FOR DISPLAYING CAPTION WINDOW

CROSS REFERENCE TO RELATED PATENT APPLICATION

This patent application is based on Taiwan, R.O.C. patent application No. 97149223 filed on Dec. 17, 2008.

FIELD OF THE INVENTION

The present invention relates to a caption window display device and a method thereof, and more particularly, to a caption window display device applied to a TV system, and a method thereof.

BACKGROUND OF THE INVENTION

As TV programs become digitized globally, demand for digital TVs continually increases. Standards of digital TVs are divided into two classifications—the European Digital Video Broadcasting (DVB) standard and the American Advanced Television System Committee (ATSC) standard. In the American ATSC standard, a Digital TV Closed Captioning (DTVCC) specification is provided to hearing impaired individuals. In a mute status, in addition to showing dialogues between characters, descriptive sentences on elements occurring on the screen are displayed, and descriptive sentences as to background sounds are also added, so that the hearing impaired individuals are allowed to better understand the plot.

Video signals transmitted from a digital TV system provider or outputted from a digital video disk (DVD) player having accessed a DVD containing closed captioning, along with a window-defining command for defining the DTVCC, are displayed on a display screen after decoding the window-defining commands by a built-in closed captioning decoder in a common ATSC digital TV. Conventionally, the closed captioning decoder is a specific chip independent from a microcontroller and a graphic engine. As functions of a TV controller having a microcontroller and a graphic engine in a digital TV grow dramatically, the foregoing decoding may be achieved by software executed by the TV controller.

Refer to FIG. 1 showing a functional block diagram of a TV system comprising a display 22, a TV controller 20 and a system memory 21. For example, the system memory 21 is a dynamic random access memory (DRAM). The TV controller 20 comprises a microcontroller 201, a graphic engine 202, a static random access memory (SRAM) 203, a memory interface unit 204 and a graphic output processor 205. The graphic engine 202 produces a caption data to be displayed on the display 22 according to the received window-defining command. For that the content of the window-defining command comprises the width and height of a caption window, i.e., m*n pixels, the graphic engine 202 draws the caption data according to the width and height of the caption window. The caption data comprises chromaticity index data, which, corresponding to the m*n pixels, is written into a predetermined block 210 of the memory 21.

Refer to FIG. 2(a) and FIG. 2(b) showing schematic diagrams of a TV controller drawing captioning on the display 22. For example, supposing that a caption window defined by a window-defining command has a two-character height, when the window-defining command along with the captioning of more than two lines is transmitted from a system provider, the TV controller has to change content of the caption window in order to display all content of the captioning A direct displacement as illustrated in FIG. 2(a) is the simplest approach for changing the content of the caption window. That is, the graphic engine 202 directly rewrites a first caption data 11 stored in the specific block 210 of the system memory 21 into a second caption data 12. However, the direct displacement is not so fast, unsmooth visual effects appear sometimes. Therefore, a scrolling technique illustrated in FIG. 2(b) is developed. The graphic engine 202 gradually rewrites the first caption data 11 stored in the specific block 210 of the system memory 21 into a third caption data 13, a fourth caption data 14, and so forth, to finally complete the rewrite to display the second caption data 12. Accordingly, a caption scrolling effect is created.

However, when applying the scrolling technology of the prior art, the graphic engine 202 needs to rewrite the caption data stored in the specific block 210 frequently, such that the memory is accessed frequently and a system resource is overconsumed. Therefore, a main object of the present invention is to develop new caption scrolling technology to overcome disadvantages of the prior art.

SUMMARY OF THE INVENTION

A method for displaying a caption window applied to a TV system comprising a system memory and an offset register is provided according to the present invention. The method firstly receives a first window-defining command by a TV controller, with the first window-defining command including a first window size and first caption content. A first caption data according to the first caption content is generated and stored into a system memory. a first portion of the first caption data stored in the system memory is accessed and displayed. A first offset stored in an offset register is updated to a second offset after a predetermined period. A second portion of the first caption data is accessed and displayed according to the second offset and the first window size.

According to the foregoing description, the first caption data is stored in a predetermined block of the system memory.

According to the foregoing description, data stored in the predetermined block is accessed from a start point, which is defined by adding the offset stored in the offset register to a default start address of the predetermined block.

According to the foregoing description, the predetermined block is a circular buffer for resetting the start point when the start point and the offset are overflowed.

Furthermore, the foregoing method for displaying a caption window may receive a second window-defining command comprising a second window size and second caption content, wherein the second window-defining command and the first window-defining command have a same window identification (ID) code. A second caption data according to the second caption content is generated and stored to the system memory. A first portion of the second caption data stored in the system memory is accessed and displayed according to a third offset stored in the offset register and the second window size. The third offset stored in the offset register updated to a fourth offset after a predetermined period. A second portion of the second caption data is accessed and displayed according to the fourth offset and the second window size.

According to another aspect of the present invention, a caption window display device applied to a TV system is provided. The device comprises a TV controller and a system memory. The TV controller comprises an offset register for receiving a first window-defining command comprising a first window size and first window content, and generates a first caption data according to the first caption content. The system memory electrically connected to the TV controller, stores the first caption data. The TV controller accesses and displays a first portion of the first caption data stored in the system memory according to a first offset stored in the offset register and the first window size.

Furthermore, the TV controller comprises a graphic engine and a graphic output processor. The graphic engine generates the first caption data and stores the first caption data into a predetermined block of the system memory. The graphic output processor electrically connected to the graphic engine and the offset register, accesses and displays a first portion of the first caption data stored in the system memory according to a first offset stored in the offset register and the first window size, updates the first offset stored in the offset register to a second offset after a predetermined period, and accesses and displays a second portion of the first caption data according to the second offset and the first window size. Preferably, data stored in the predetermined block is accessed from a start point, which is defined by adding the offset stored in the offset register to a default start address of the predetermined block. Preferably, the predetermined block is a circular buffer for resetting the start point when the start point and the offset when are overflowed. The TV controller further receives a second window-defining command comprising second window size and second caption content, wherein the second window-defining command and the first window-defining command have a same ID code; generates a second caption data according to the second caption content and stores the second caption data into the system memory; accesses and displays a first portion of the second caption data stored in the system memory according to a third offset stored in the offset register and the second window size; and updates the third offset stored in the offset register to a fourth offset after a predetermined period, and accesses and displays a second portion of the second caption data according to the fourth offset and the second window size.

BRIEF DESCRIPTION OF THE DRAWINGS

Following description and figures are disclosed to gain a better understanding of the advantages of the present invention.

FIG. 2(a) and FIG. 2(b) are schematic diagrams of a TV controller drawing captioning outside a caption window on the display 22 of the prior art.

DETAILED DESCRIPTION OF THE PREFERRED EMBODIMENT

Figure 3A:
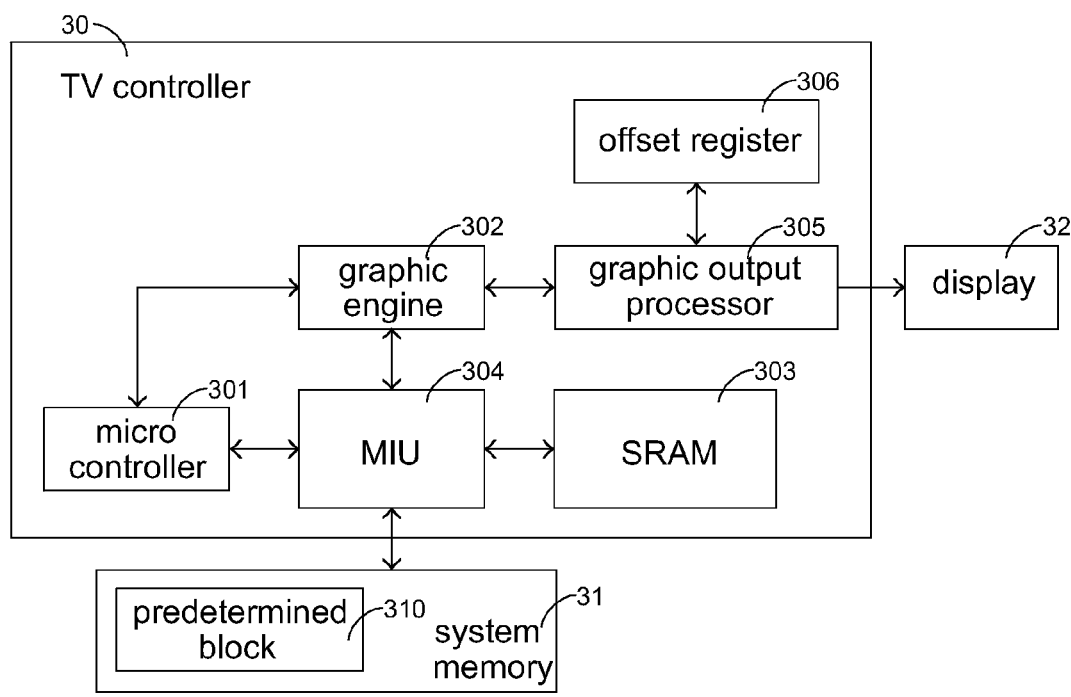
FIG. 3(a) is a functional block diagram of a TV system performing a caption window property defining method in accordance with an embodiment of the present invention.

Refer to FIG. 3(a) showing a functional block diagram of a TV system capable of displaying a caption window in accordance with an embodiment of the present invention. The TV system comprises a display 32, a TV controller 30, and a system memory 31 independent from the TV controller 30. For example, the system memory 31 is a DRAM. The TV controller 30 comprises a microcontroller 301, a graphic engine 302, an SRAM 303, a memory interface unit 304, a graphic output processor 305, and an offset register 306.

Figure 1:
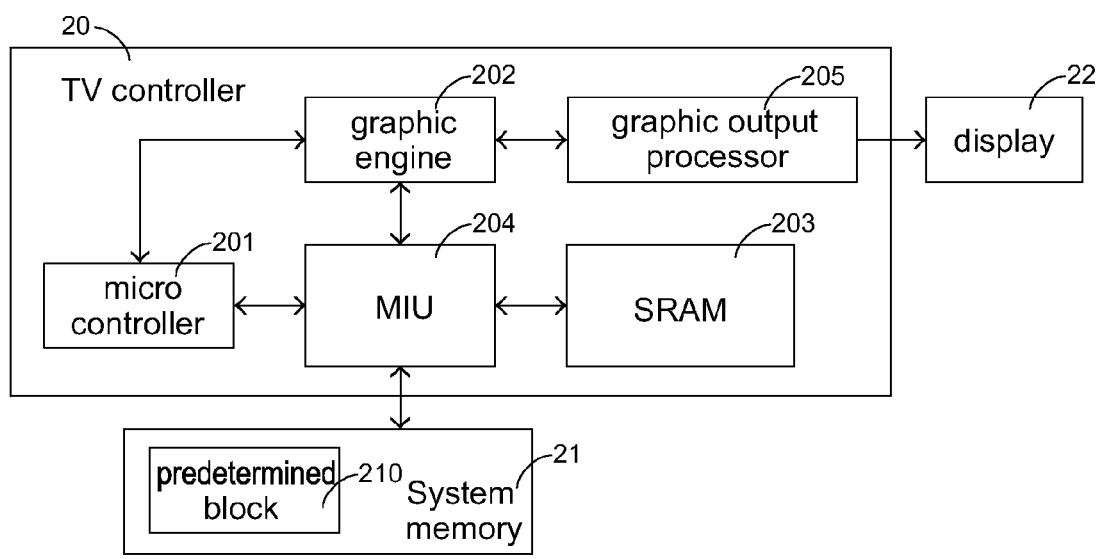
FIG. 1 is a functional block diagram of a conventional TV system.
Figure 2A:
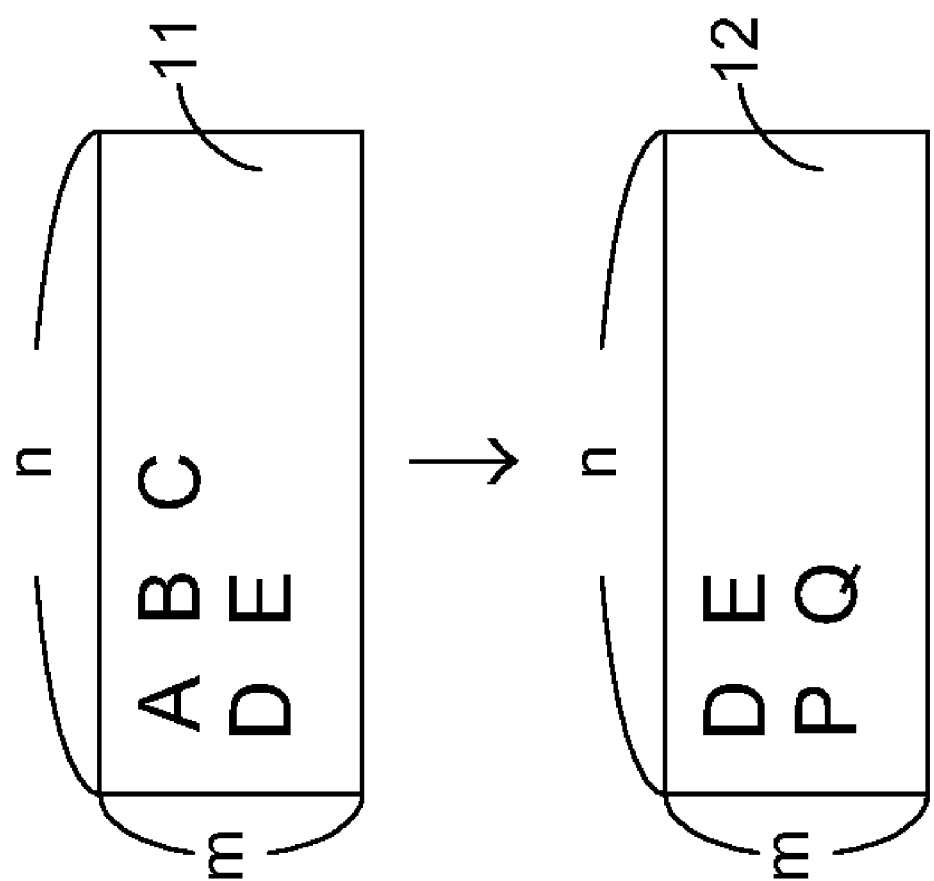
Figure 3B:
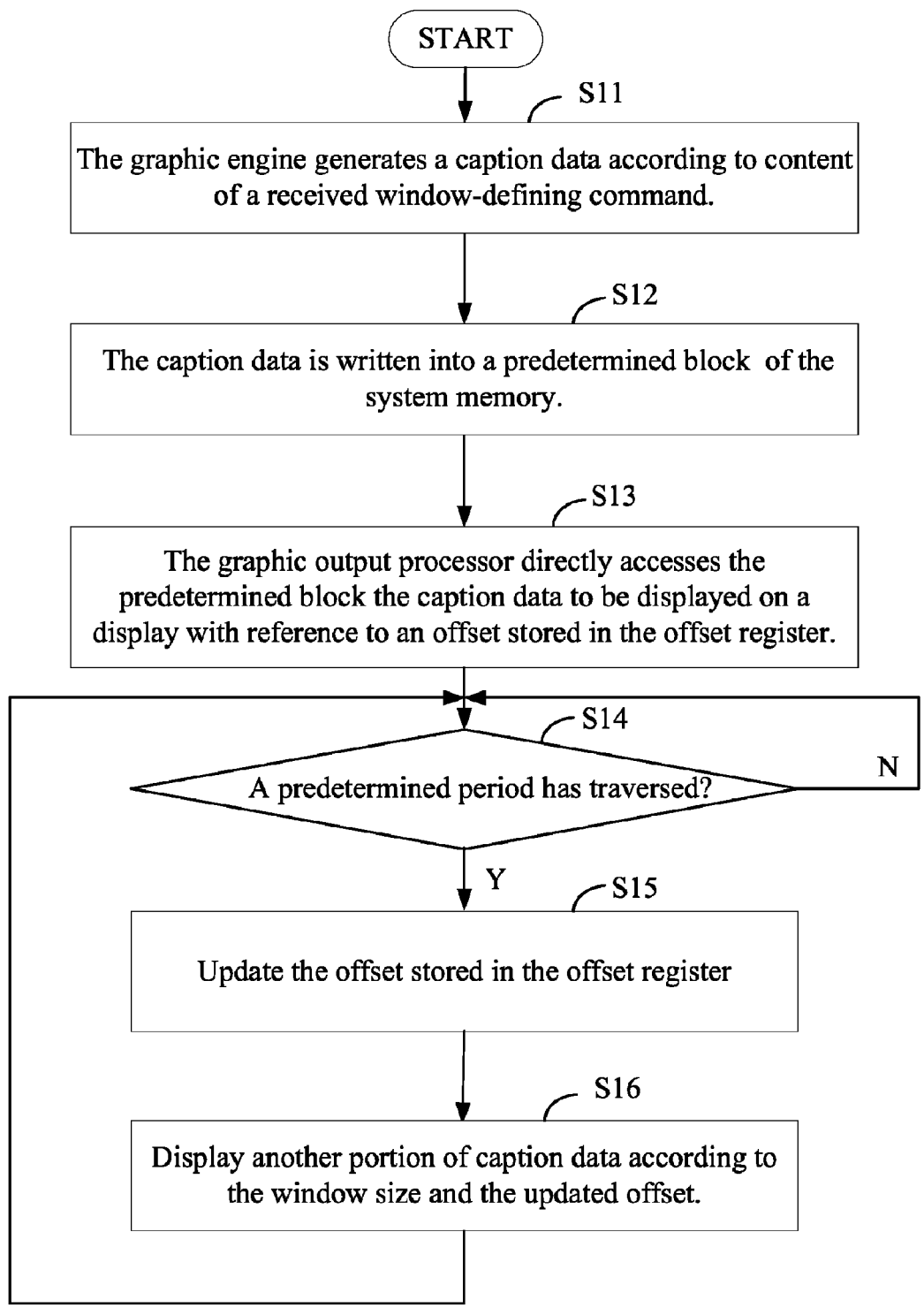
FIG. 3(b) is a flowchart of a method for displaying a caption window in accordance with a preferred embodiment of the present invention.

Refer to FIG. 3(b) showing a flowchart of a method for displaying a caption window in accordance with a preferred embodiment of the present invention. In Step S11, the graphic engine 302 generates a caption data according to content of a received window-defining command. In Step S12, the graphic engine 302 stores the caption data into a predetermined block 310 of the system memory 31. The size of the caption data is not limited to a height limitation specified by the window-defining command, and the caption data generated according to the caption content of the window-defining command are stored altogether into the predetermined block 310. Comparing with the conventional approach illustrated in FIG. 2(b), the graphic engine 202 operates several times to respectively generate a plurality of caption data complying with the height limitation of the caption window, and the plurality of caption data are stored into the memory in order to create a caption scrolling effect. For example, suppose that the height, of the caption window, defined in the received window-defining command, is a two-character height, and the caption content contains more than two lines of characters, however. Accordingly, the graphic engine 302 also draws and writes all the caption content into the predetermined block 310 as shown by a schematic diagram of caption content illustrated in FIG. 4.

Figure 4:
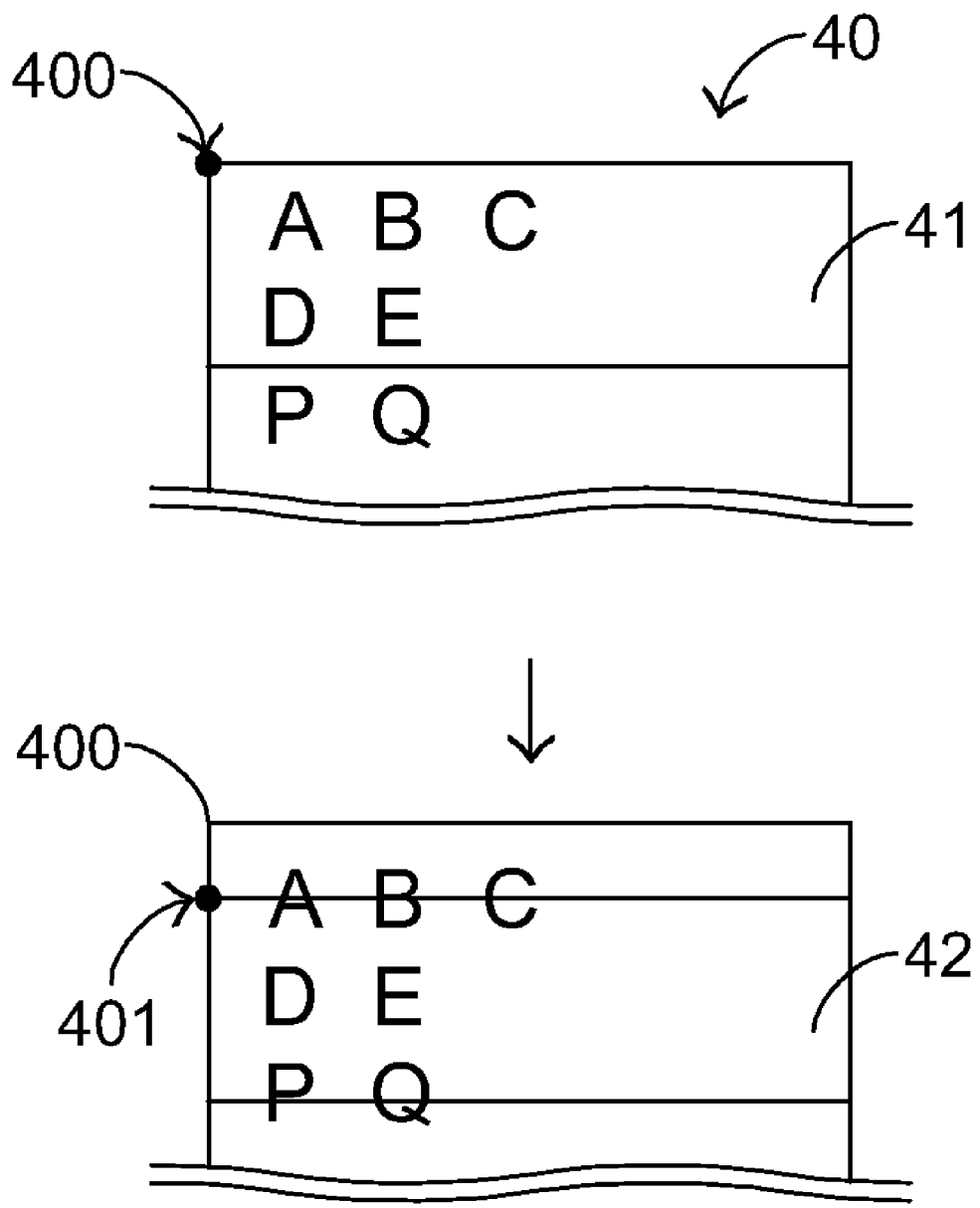
FIG. 4 is a schematic diagram of a caption data in accordance with an embodiment of the present invention.

As shown in FIG. 4, the predetermined block 310 stores a complete caption data 40 having a three-character caption height. Therefore, before a next window-defining command having a same window ID code is received, the system needs to finish displaying all the caption content in a caption window having a two-character height. In Step S13, with reference to an offset stored in the offset register 306, the graphic output processor 305 directly accesses from the predetermined block 310 the caption data 40 to be displayed on a display 32. Further, the graphic output processor 305 is defined to access data from a start point to display the captioning within a predetermined range of the predetermined block 310. For example, the start point is defined by adding an offset stored in the offset register 306 to a default start address of the predetermined block 310. Therefore, when the offset stored in the offset register 306 is 0, the graphic output processor 305 accesses and displays data stored in the predetermined block 310 from a first start point 400 illustrated in FIG. 4, and further displays caption data within a range marked by a frame 41 on the display 32. In Step S14, whether a predetermined period has passed is determined. When positive, proceed to Step S15. In Step S15, the offset stored in the offset register 306 is rewritten to change the start point so that the graphic output processor 305 next accesses data from a second start point 401. In Step S16, caption data within a range marked by a frame 42 illustrated in FIG. 4 is outputted and displayed. Accordingly, by gradually increasing the offset stored inside the offset register 306, an access address that the graphic output processor 305 reads is incremented, so as to sequentially output caption content with a scrolling effect without the process of writing into a memory when the captioning is scrolled to overcome the disadvantages of the conventional approach.

The predetermined block 310 may also be designed as a circular buffer. Therefore, upon receiving a next window-defining command having a same window ID code, the predetermined block 310 generates another caption data according to content of the window-defining command and writes the caption data into a subsequent block of the predetermined block 310. When all blocks are occupied, the predetermined block 310 is written again from the beginning address. For example, when a received caption window defined by a window-defining command has a two-character height and the caption content is expressed in more than four lines of characters, in this embodiment, the graphic engine 302 draws and writes all the caption content into the predetermined block 310 as shown by a schematic diagram of caption content illustrated in FIG. 5.

Figure 5:
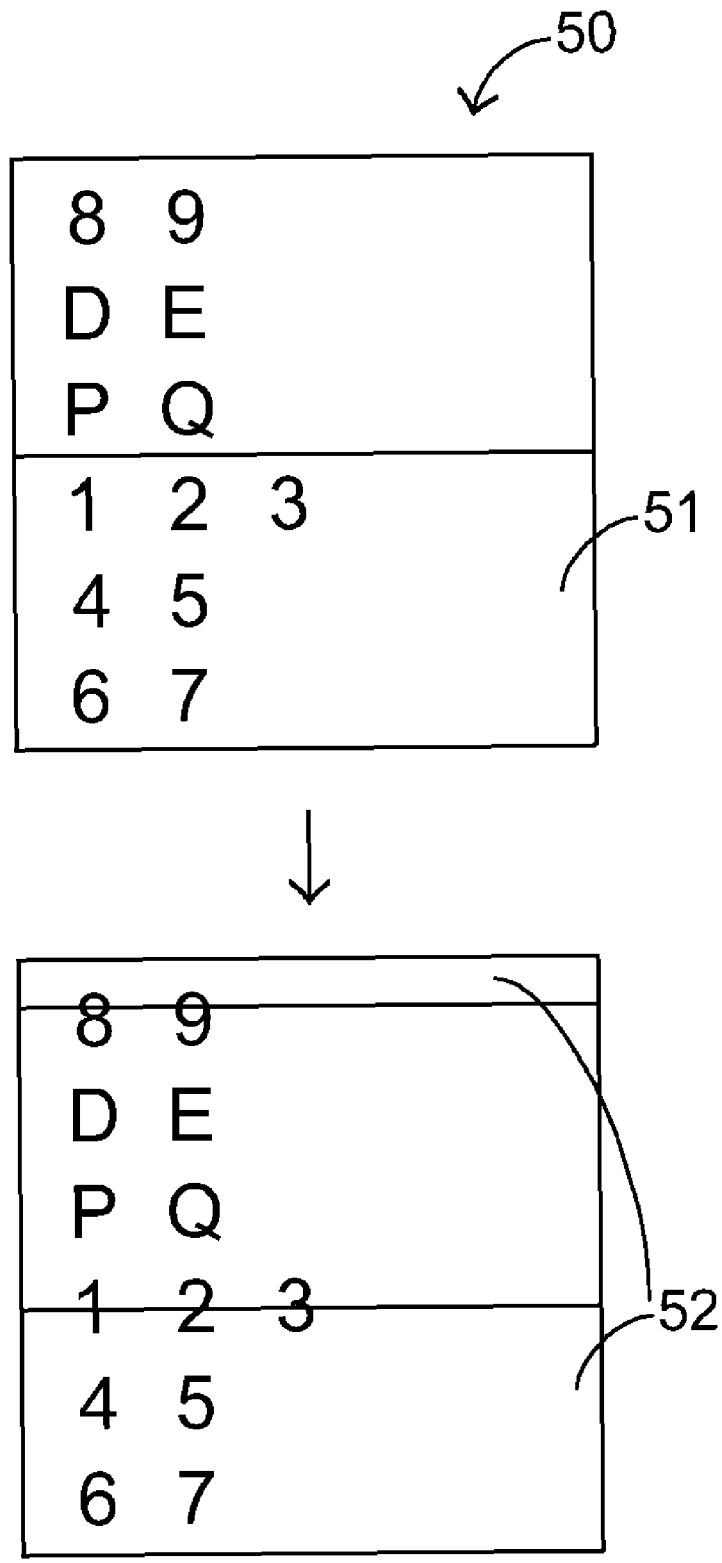
FIG. 5 is a schematic diagram of another caption data in accordance with an embodiment of the present invention.

As shown in FIG. 5, the predetermined block 310 is previously stored with a three-character height caption data defined by a previous window-defining command. Supposing that the predetermined block 310 accommodates a six-character height, the predetermined block 310 is bound to run out of memory space when a fourth line of a next captioning is written into it. However, since the predetermined block 310 is designed as a circular buffer, the first line of the previous captioning is overwritten as a caption data 50 illustrated in FIG. 5. Moreover, the offset stored in the offset register 306 is incremented, and the graphic output processor 305 moves the access range by varying the offset, so as to control the graphic output processor 305 to output the captioning with a scrolling effect. The offset returns to zero when an access index defined by the default start address and the offset overflows, so that the predetermined block 310 is again accessed from the start address at the beginning of the predetermined block 310 and continues to process, without intermittence, the caption content subsequently received.

In addition, when the size of a window defined by a next window-defining command having a same window ID code changes, e.g., the height changes from a two-character height to a three-character height, a system according to an embodiment of the present invention need not clear content of the predetermined block 310, but only need to change the predetermine range defined by the graphic output processor 305 from the two-character height to a three-character height. Accordingly, without wasting resources for redrawing the captioning as in the prior art, three lines of caption data within ranges marked by frames 51 and 52 illustrated in FIG. 5 are displayed on the display 32. Moreover, in the DTVCC specification, a DTV system provider is allowed to transmit an image data that contains at most 8 windows defining commands. Therefore, when a next received window-defining command has a different window ID code from a previous one, the system allocates another predetermined block to process the window-defining command.

In conclusion, according to the present invention, without applying a large number of graphic operations or repeatedly rewriting a memory, a caption window display device and a method thereof are provided to accomplish window scrolling, so that the disadvantages of the prior art having high hardware requirements and cost are overcome to achieve the main object of the present invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for displaying a caption window, applied to a television (TV) system comprising a system memory and a TV controller comprising a microcontroller, and an offset register coupled to and directly controlled by a graphic output processor, the method comprising:

receiving a first window-defining command comprising a first window size and first caption content;
generating a first completed caption data which is larger than the first window size according to the first whole caption content and storing the first completed caption data into the system memory;
accessing and displaying a first portion of the first caption data in the system memory according to a first offset stored in the offset register and the first window size; and
updating, using the graphic output processor, the first offset stored in the offset register to a second offset after a predetermined period, and accessing and displaying a second portion of the first caption data according to the second offset and the first window size.

2. The method as claimed in claim 1, wherein the first caption data is stored in a predetermined block of the system memory.

3. The method as claimed in claim 2, wherein data of the predetermined block is accessed from a start point, which is defined by adding the offset stored in the offset register to a default start address of the predetermined block.

4. The method as claimed in claim 3, wherein the predetermined block is a circular buffer, and the offset returns to zero when an access index defined by the default start address and the offset overflows.

5. The method as claimed in claim 1, further comprising:
receiving a second window-defining command comprising a second window size and second caption content, wherein the second window-defining command and the first window-defining command comprise a same window identification (ID) code;
generating a second caption data according the second caption content and storing the second caption data into the system memory;
accessing and displaying a first portion of the second caption data in the system memory according to a third offset stored in the offset register and the second window size; and
updating the third offset stored in the offset register to a fourth offset after a predetermined period, and accessing and displaying a second portion of the second caption data according to the fourth offset and the second window size.

6. A caption window display device, applied to a TV system, the device comprising:
a TV controller, comprising a micro controller, a graphic output processor, and an offset register coupled to and directly controlled by the graphic output processor, said offset register having a first offset stored therein, for receiving a first window-defining command comprising a first window size and first caption content, and generating a first caption data which is larger than the first window size according to the first caption content; and
a system memory, electrically connected to the TV controller, for storing the first caption data, wherein, the TV controller accesses and displays a first portion of the first caption data stored in the system memory according to the first offset and the first window size
wherein the graphic output processor is configured for accessing and displaying a first portion of the first caption data stored in the system memory according to the first offset stored in the offset resister and the first window size, updating the first offset stored in the offset register to a second offset after a predetermined period, and accessing and displaying a second portion of the first caption data according to the second offset and the first window size.

7. The caption window display device as claimed in claim 6,
wherein the TV controller further comprises:
a graphic engine, for generating the first caption data according to the first caption content and storing the first caption data into a predetermined block of the system memory.

8. The caption window display device as claimed in claim 7, wherein the graphic output processor accesses the predetermined block from a start point, which is defined by adding the offset stored in the offset register to a default start address of the predetermined block.

9. The caption window display device as claimed in claim 8, wherein the predetermined block is a circular buffer, and the offset returns to zero when an access index defined by the default start address and the offset overflows.

10. The caption window display device as claimed in claim 6, wherein the TV controller further receives a second window-defining command comprising a second window size and second caption content;
the second window-defining command and the first window-defining command comprise a same window ID code; and
the TV controller generates a second caption data according to the second caption content and stores the second caption data into the system memory, accesses and displays a first portion of the second caption data stored in the system memory according to a third offset stored in the offset register and the second window size, updates the third offset stored in the offset register into a fourth offset after a predetermined period, and accesses and displays a second portion of the second caption data according to the fourth offset and the second window size.

* * * * *